No. 680,978. Patented Aug. 20, 1901.
S. V. HUBER.
ROLLING MILL.
(Application filed June 18, 1900.)
(No Model.) 8 Sheets—Sheet 1.

WITNESSES:
F. M. Dapper.
J. H. Bradley.

INVENTOR
Sigmund V. Huber
by Darwin S. Wolcott
Att'y.

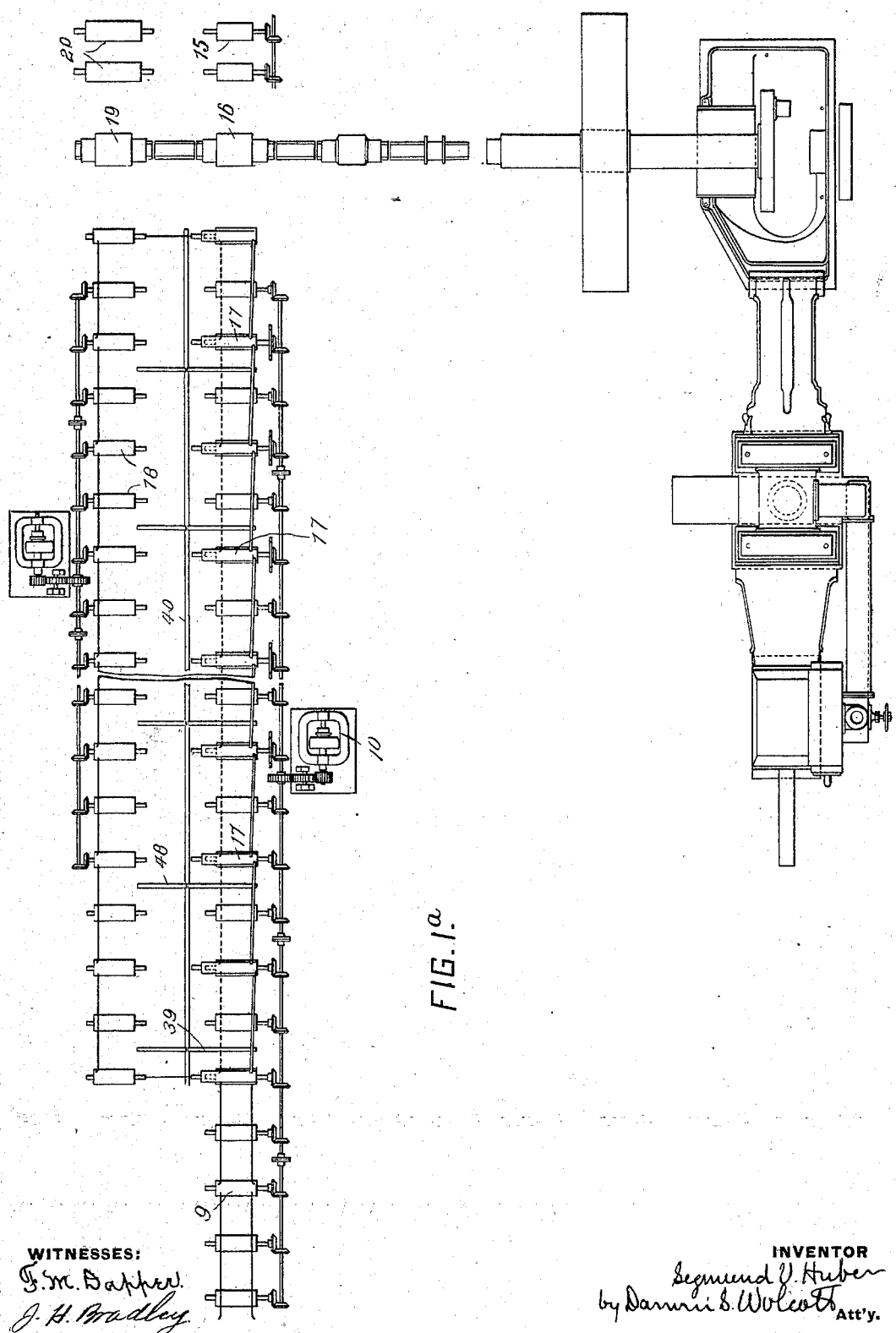

No. 680,978. Patented Aug. 20, 1901.
S. V. HUBER.
ROLLING MILL.
(Application filed June 18, 1900.)
(No Model.) 8 Sheets—Sheet 3.

WITNESSES: INVENTOR
Siegmund V. Huber
by Darwin S. Wolcott
Att'y.

No. 680,978.

S. V. HUBER.
ROLLING MILL.
(Application filed June 18, 1900.)

Patented Aug. 20, 1901.

(No Model.)

8 Sheets—Sheet 4.

WITNESSES:
G. M. Dapper.
J. H. Bradley.

INVENTOR
Seymund V. Huber
by Daniel S. Wolcott
Att'y.

No. 680,978. Patented Aug. 20, 1901.
S. V. HUBER.
ROLLING MILL.
(Application filed June 18, 1900.)
(No Model.) 8 Sheets—Sheet 5.
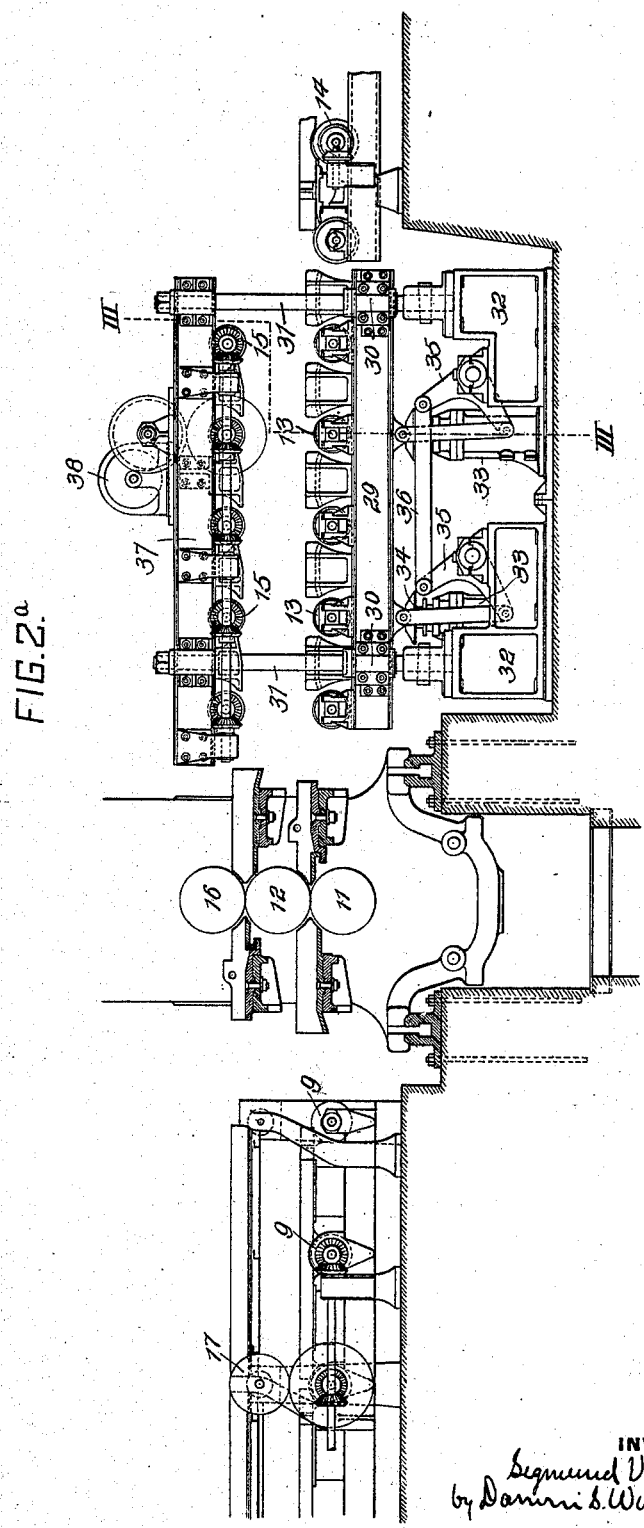
WITNESSES:
F. M. Dappert.
J. H. Bradley.
INVENTOR
Sigmund V. Huber
by Darwin S. Wolcott
Att'y.
THE NORRIS PETERS CO., PHOTO-LITHO., WASHINGTON, D. C.

No. 680,978. Patented Aug. 20, 1901.
S. V. HUBER.
ROLLING MILL.
(Application filed June 18, 1900.)
(No Model.) 8 Sheets—Sheet 6.

WITNESSES:

INVENTOR
Sigmund V. Huber
by Darius S. Wolcott
Att'y.

No. 680,978.

S. V. HUBER.
ROLLING MILL.
(Application filed June 18, 1900.)

(No Model.)

Patented Aug. 20, 1901.

8 Sheets—Sheet 7.

WITNESSES:
F. M. Dapper.
O. H. Bradley.

INVENTOR
Sigmund V. Huber
by Damon S. Wolcott
Att'y.

No. 680,978.  
S. V. HUBER.  
ROLLING MILL.  
(Application filed June 18, 1900.)  
Patented Aug. 20, 1901.

(No Model.)

8 Sheets—Sheet 8.

WITNESSES:  
F. M. Dapper  
J. H. Bradley

INVENTOR.  
Sigmund V. Huber  
by Darwin S. Wolcott  
Att'y.

UNITED STATES PATENT OFFICE.

SIGMUND V. HUBER, OF PITTSBURG, PENNSYLVANIA.

ROLLING-MILL.

SPECIFICATION forming part of Letters Patent No. 680,978, dated August 20, 1901.

Application filed June 18, 1900. Serial No. 20,669. (No model.)

*To all whom it may concern:*

Be it known that I, SIGMUND V. HUBER, a citizen of the United States, residing at Pittsburg, in the county of Allegheny and State of Pennsylvania, have invented or discovered certain new and useful Improvements in Plants for Rolling Plates or Bars, of which improvements the following is a specification.

The invention described herein relates to certain improvements in rolling-mill plants for the continuous reduction of ingots to a bar or plate formed without any reversal of the feed mechanism employed and without the turning of the article to effect a finishing of the edges thereof.

The invention is hereinafter more fully described and claimed.

Figure 1:
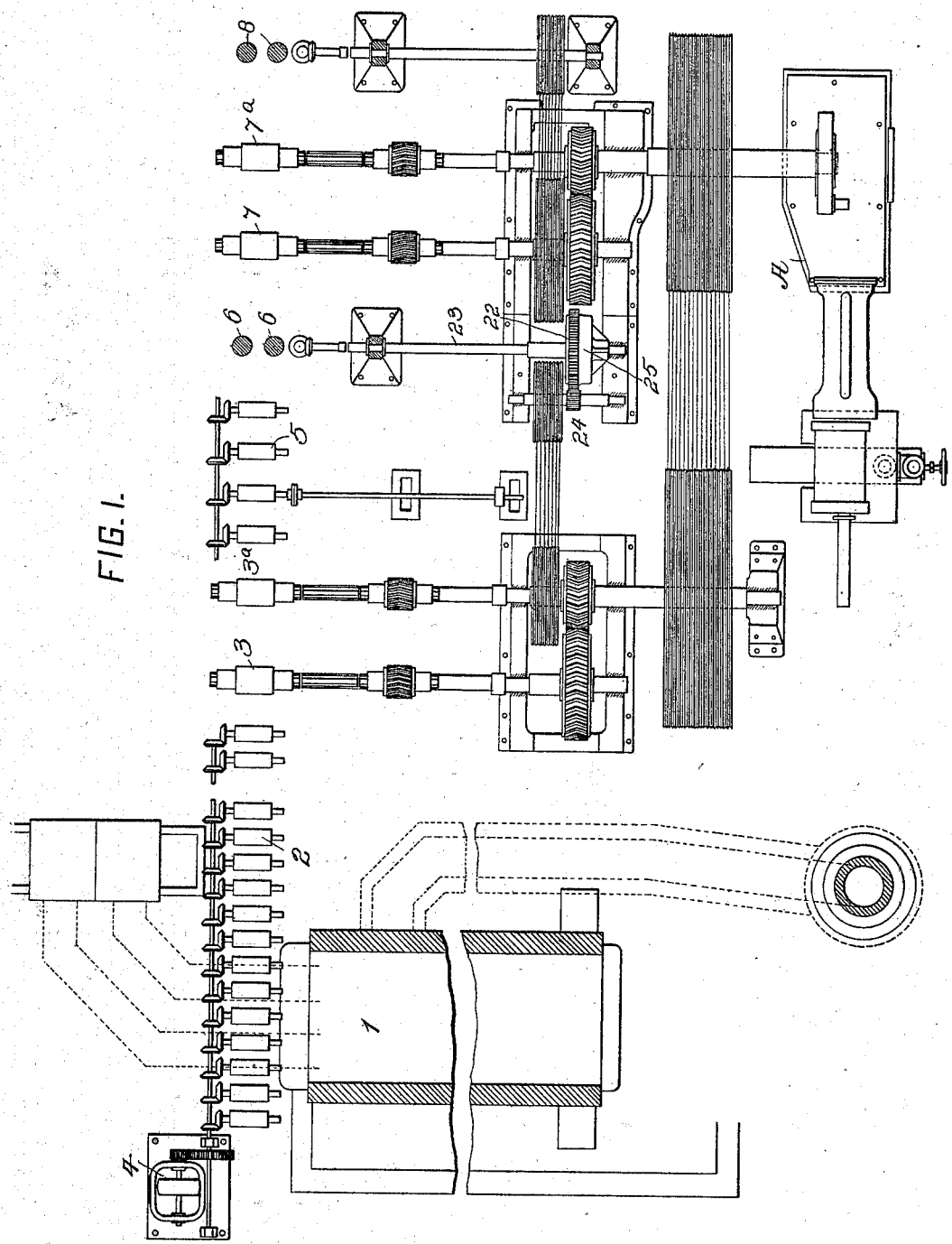
Figure 1B:
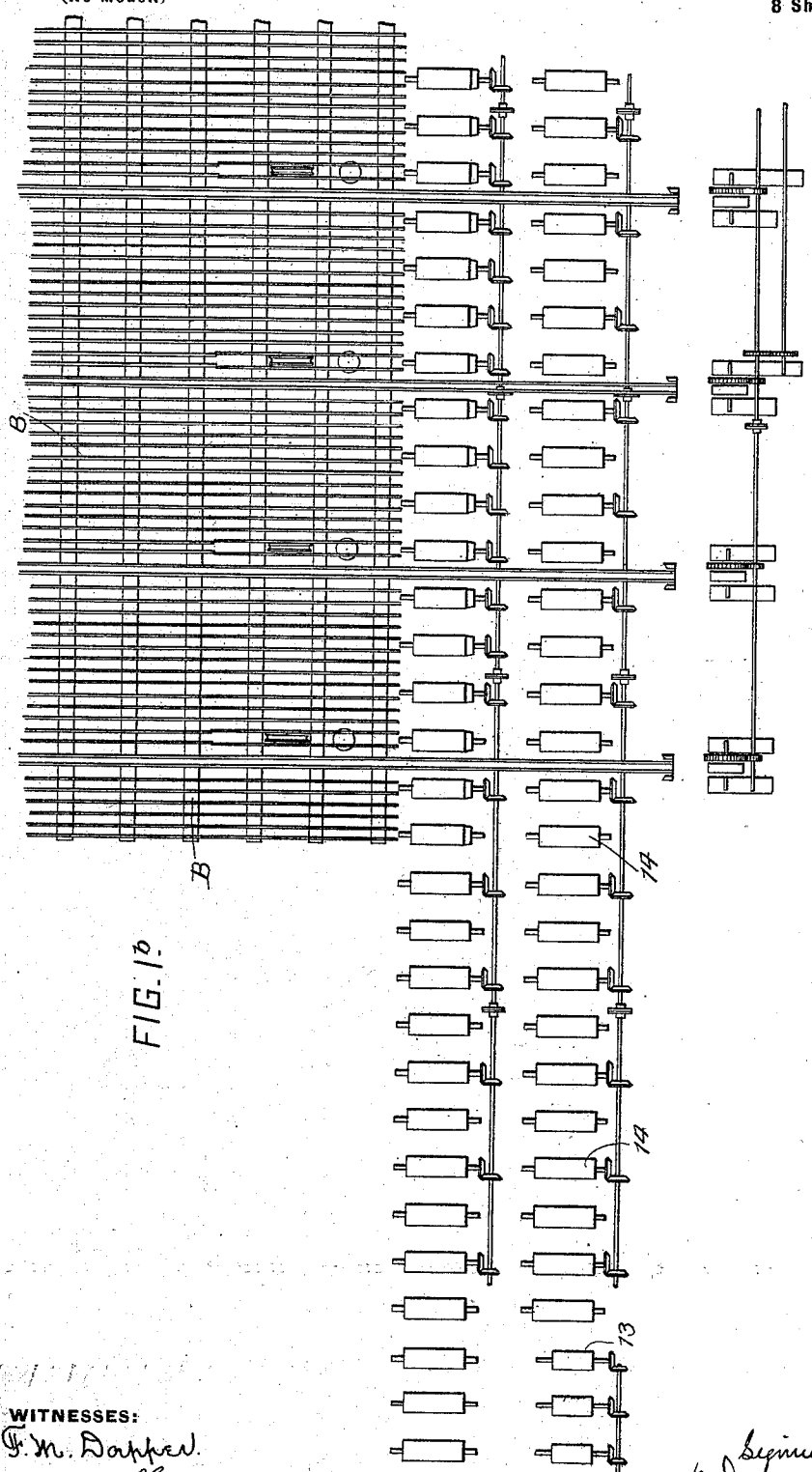
Figure 2:
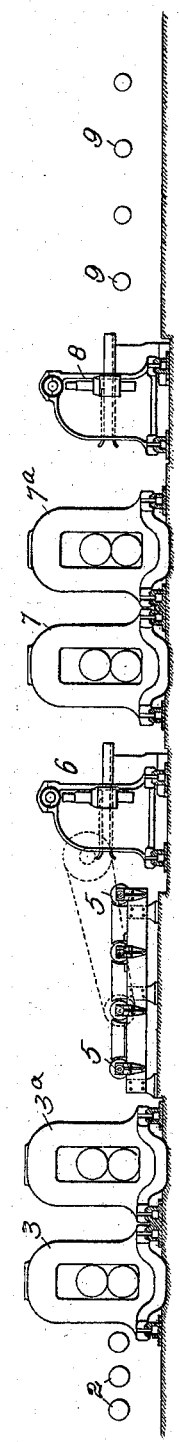
Figure 3:
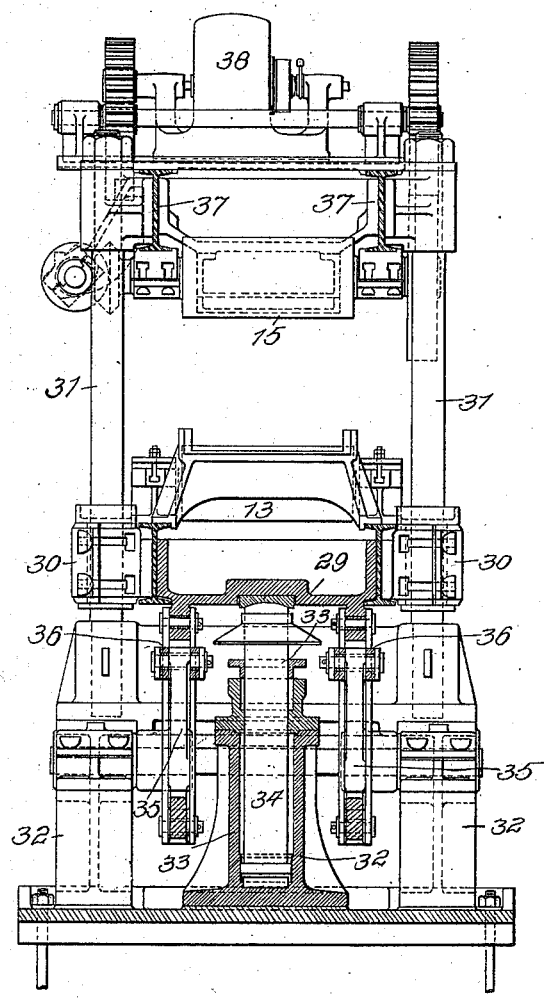
Figure 4:
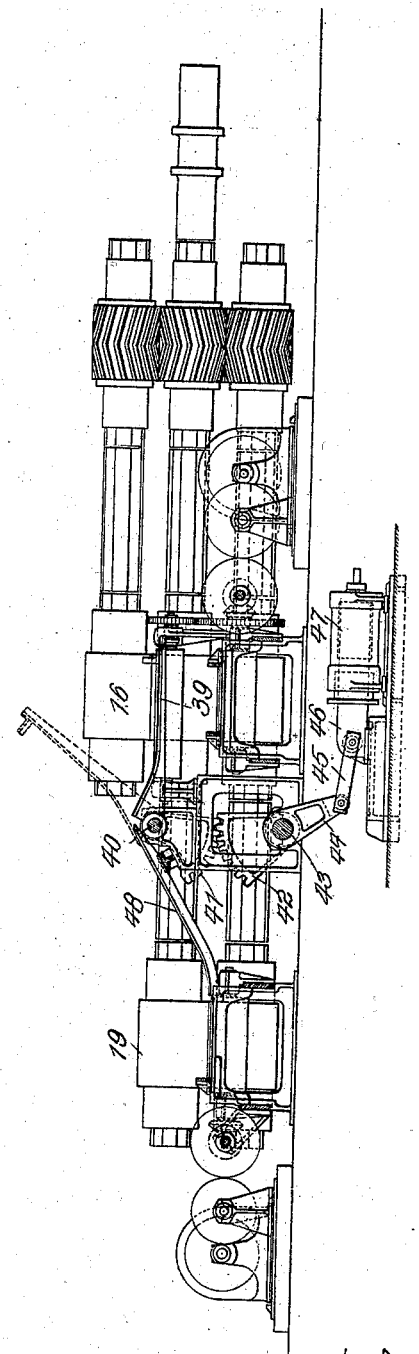
Figure 5:
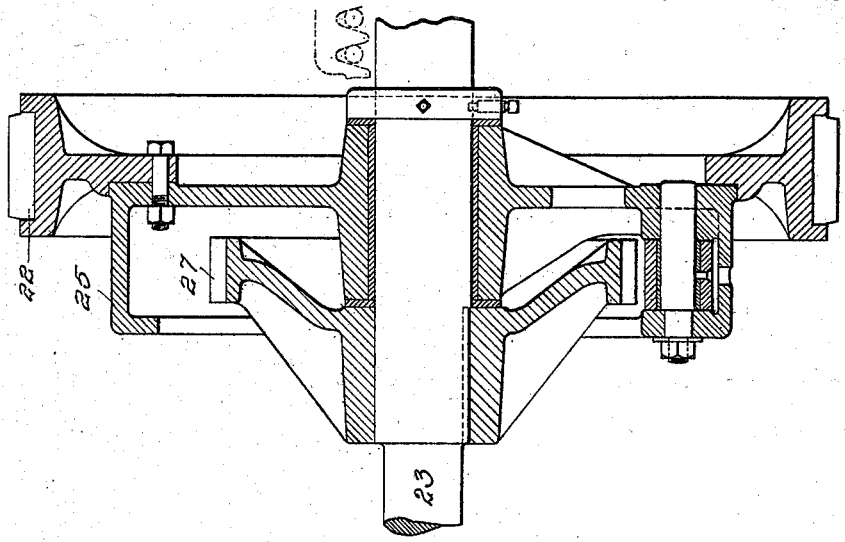
Figure 6:
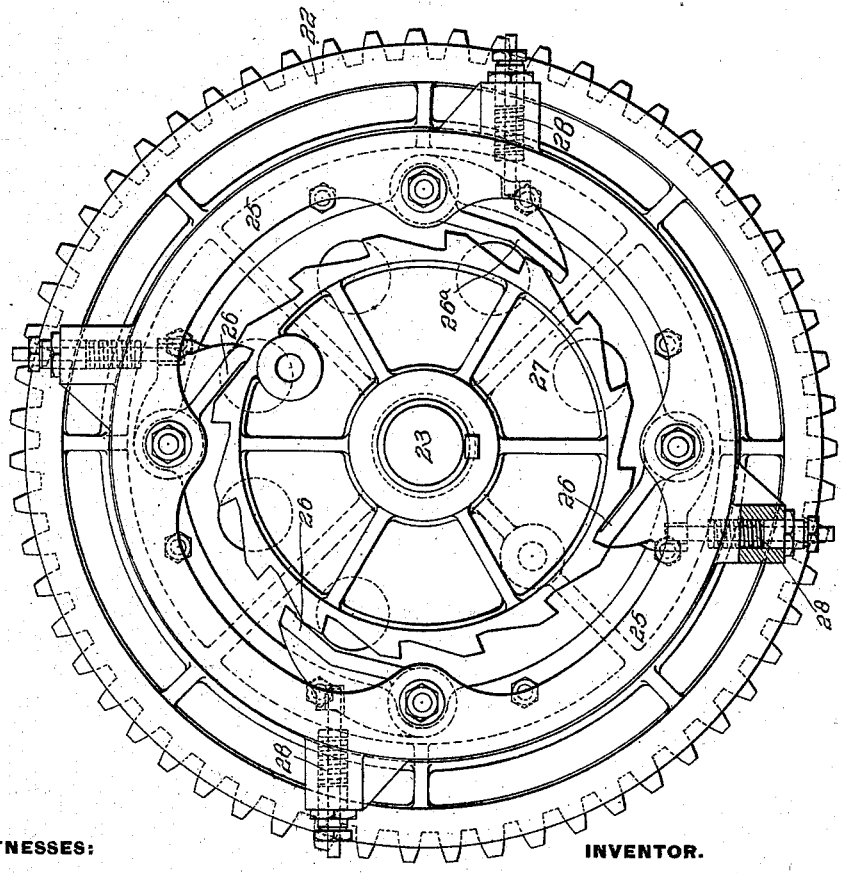

In the accompanying drawings, forming a part of this specification, Figures 1, 1$^a$, and 1$^b$ illustrate in plan the arrangement and relative locations of the several mills and their feed mechanism. Figs. 2 and 2$^a$ represent, partly in section and partly in elevation, the several mills and their feed mechanisms. Fig. 3 is a transverse section, the plane of section being indicated by the line III III, Fig. 2$^a$. Fig. 4 is a front elevation of the finishing-mill. Figs. 5 and 6 are side and sectional elevations, respectively, of the clutch mechanism connecting the vertical rolls with their driving mechanism.

In the practice of my invention one or more suitable heating-furnaces 1 are arranged in convenient proximity to the feed-table 2, which is located in front of the blooming-rolls 3 and 3$^a$. The rollers composing the feed-table 2 are positively driven in one direction, so as to effect the movement of the ingot into the blooming-rolls 3, preferably by means of an electric motor 4. The rolls 3 and 3$^a$ of the blooming-mill are arranged in tandem and preferably in such relation to each other that the front rolls 3 will serve as a feed mechanism for the rolls 3$^a$, thereby avoiding the necessity of employing feed mechanism between said two pairs of rolls. A feed mechanism having positively-driven rollers 5 is arranged in the rear of the rolls 3$^a$ and is adapted to feed the article between the vertical or edging rolls 6. In the rear of the edging-rolls 6 are arranged two pairs of horizontal roughing-rolls 7 and 7$^a$ and a second pair of vertical or edging rolls 8. These several pairs of rolls are arranged in such relation or proximity to each other that the vertical rolls 6 will feed the article to the roughing-rolls 7, and the latter will in turn serve as a feed mechanism for the second pair of horizontal roughing-rolls 7$^a$, which will in turn feed the article to the edging-rolls 8. In the rear of the edging-rolls 8 is arranged a feed mechanism 9, consisting of rollers positively driven, preferably by electric motor 10, to effect the movement of the article from the edging-rolls 8 to and between the lower and middle rolls 11 and 12 of the three-high mill. In the rear and on a level with the line of feed of the lower and middle rolls is arranged a feed mechanism consisting of a series of frictionally-driven rollers 13 and a series of positively-driven rollers 14. The frictionally-driven rollers 13 are mounted, as will be hereinafter described, in a vertically-moving frame, whereby the rear end of the article after having passed beyond the bite of the rolls 11 and 12 is raised and pressed against the rollers 15, which are positively driven by suitable mechanism in such direction as to effect the feed of the article in a reverse direction between the middle and upper rolls 12 and 16. In front of the three-high mill and in the same horizontal plane as the bite of the middle and upper rolls is arranged a feed mechanism consisting of frictionally-driven rollers 17. The article is transferred laterally from these rollers 17 to the rollers 18, which are arranged in front of the two-high finishing-rolls 19 by means of a transfer mechanism to be hereinafter described. In the rear of the two-high rolls 19 is arranged a feed mechanism having positively-driven rolls 20, adapted to receive the article and feed it along into such position as will permit of its transfer laterally onto the hot bed B.

The driving mechanism of the rolls 3 and 3$^a$ is so constructed as to effect a proportional rotation of said roll, the roll 3$^a$ being driven at a higher speed than the rolls 3 proportional to the reduction effected in the rolls 3. The article while being reduced in these rolls 3 and 3$^a$ is of such size and in such condition that a slight difference in the proportional speeds of these rollers will not have any material effect, as one pair of rolls will operate to facilitate the rotation of the other through the medium of the article itself, which at this stage of its reduction is of sufficient size for that purpose.

It should be observed that the first pair of vertical rolls 6, the horizontal rolls 7 and 7ª, and rolls 8 are arranged continuously—i. e., in such manner that one pair of rolls will serve as a feed mechanism for the succeeding pair. The rolls 7 7ª are driven directly by the engine A, which also drives the blooming-rolls 3 3ª, preferably by rope transmission. The vertical rolls 6 are driven from the driving-shaft of the blooming-rolls and the vertical rolls 8 from the driving-shaft of one of the roughing-rolls 7 7ª. The driving mechanisms of the several stands of rolls are so constructed that each succeeding pair of rolls is driven at a speed higher than that of the preceding pair of rolls proportional to the reduction effected by the latter.

In determining the speed at which succeeding pairs of rolls in a continuous mill must be driven not only the peripheral speed of the preceding pair must be taken account of, but also the amount of reduction effected by the preceding pair. As, for example, if the first pair effects a fifty-per-cent. reduction the succeeding pair must be driven at a higher speed than if a five or ten per cent. reduction was being effected by the first pair of rolls. The vertical rolls 6, which are the first pair of the continuous roughing-train, effect very little reduction, but the reduction effected by the rolls 7 may vary from five to fifty per cent. As it is not practicable to provide for adjusting the proportional speeds of the rolls 6 and 7 with each change or variation in reduction effected by the rolls 7, the speeds of these pairs of rolls are adjusted to conditions incident to the greatest reduction effected by the rolls 7, and provision is made for an automatic acceleration of the speed of rolls 6 by the rolls 7 when the latter are effecting a reduction less than the maximum. To this end a clutch mechanism is interposed between the shaft of the vertical rolls 6 and their driving mechanism. This clutch mechanism consists, as shown in Figs. 5 and 6, of a gear-wheel 22, loosely mounted upon the driving-shaft 23 of the vertical rolls and driven by a pinion 24, as shown in Fig. 1. On the side of the gear-wheel is secured a frame or housing 25, in which a series of pawls 26 and 26ª are mounted in such manner as to engage a toothed wheel 27, keyed to the driving-shaft 23. The two sets of pawls are pushed inwardly by means of springs 28 in such manner as to insure their engagement with the teeth of the wheel 27. It is preferred that these pairs or sets of pawls should be so arranged in such relation to each other and the length of the teeth on the wheel 27 that when one pair or set, as 26, are in engagement with the toothed wheel the other pair or set will not be in engagement until the toothed wheel has been moved forward a distance equal or approximately equal to one-half of the length of the teeth on the wheel 27. In the operation of the mill the horizontal rolls 7 and 7ª will have a firmer bite upon the article than the vertical rolls, and the driving mechanism of the rolls 7 and 7ª are arranged to have a speed greater than that of the vertical rolls 6 proportional to the maximum reduction and consequent elongation effected by the vertical rolls. If the reduction is reduced, the article will pass more quickly through the horizontal rolls; but this increased speed of the article will not produce any injurious effect, as the vertical rolls will be frictionally operated by the article, the clutch mechanism permitting of the vertical rolls being rotated faster than their driving mechanism. As the vertical rolls 8 do not effect any material reduction and consequent retardation of the onward movement of the article, they can be driven at approximately the same speed as the rolls 7ª.

The rollers 13 in the rear of the three-high mill are loosely mounted in suitable bearings secured upon a beam or frame 29, which is provided with guide-sleeves 30, surrounding posts or standards 31, secured upon a bed-plate 32. This frame 29 is adapted to be moved up and down along the posts or standards 31 by means of fluid-pressure mechanism consisting of cylinders 33 and rams 34. In order to secure the uniform motion of each end of the frame 29, said frame is connected to arms of bell-crank levers 35, mounted in suitable bearings on the foundation 32. The other arms of these bell-cranks are connected together by links 36. Upon the upper ends of the posts or standards 31 is secured a frame 37, provided with suitable bearings for the rollers 15, which are positively driven through a suitable train of gearing by the electric motor 38, supported by the frame 37. These rollers are so rotated as to effect the feed of an article in contact therewith toward the three-high mill and are so arranged that the article fed thereby will be moved in between the middle and upper rolls of said mill. In operating my plant the article is fed by the lower and middle rolls of this mill onto the rollers 13 and 14, the latter being positively driven, as hereinbefore stated, and as soon as the rear end of the article passes from between the bite of the lower and middle rolls 11 and 12 the feed-rollers 14 are stopped and the frame 27 is raised, thereby lifting the rear end of the article which rests upon the rollers 13 up against the positively-driven rollers 15, so that the article is firmly gripped between the rollers 13 and 15. As soon as this grip is effectual the article will be forced in reverse direction between the rolls 12 and 16 and will be fed by them onto the rollers 17, arranged in front of the finishing-mill and immediately above the rollers 9 of the feed-table, which effects the movement of the article from the vertical rolls 8 to the three-high mill.

In order to effect a transference of the article from the rollers 17 to the rollers 18, a series of arms 39 are secured to a shaft 40 in such manner as to normally lie unparallel with the rolls 17 and slightly below their supporting-surfaces, so as not to interfere with the movement of the article along the rolls 17. On the shaft is secured a series of toothed segments 41, which engages a similar series of segments 42 on the shaft 43. An arm 44 is secured upon this shaft 43 and has its outer end connected by a link 45 to the ram 46 of hydraulic cylinder 47. By the operation of this hydraulic cylinder the arm 40 will be rotated so as to lift the arms 39 to inclined position, as shown in dotted lines in Fig. 4, thereby raising a bar lying upon the rollers 17, so that it will slide down the arms 39 and along inclined rails 48 onto the positively-driven feed-rollers 18, whereby the article will be fed to the two-high rolls 19. From these rolls the article is carried by the feed-rollers 20 into such a position that it can be transferred laterally by any suitable form of transfer mechanism known to the art onto the hot bed B.

I claim herein as my invention—

1. In an apparatus for rolling plates or bars, the combination of a continuous blooming-train consisting of two or more stands of rolls, a continuous roughing-train consisting of edging and reducing rolls, a three-high mill, the roughing-train and three-high mill being arranged in tandem with the blooming-train, a two-high finishing-mill having its rolls arranged with their axes in or approximately in line with the axes of the rolls of the three-high mill and a transfer mechanism in front of the three-high mill for shifting the article from a position in line with the three-high mill to a feed position in front of a two-high mill, whereby the article can be fed continuously through the several rolls, substantially as set forth.

2. In an apparatus for rolling plates or bars, the combination of a blooming-train consisting of two or more stands of rolls, a continuous roughing-train consisting of edging and reducing rolls, a clutch mechanism connecting one of the stands of edging-rolls with its driving mechanism, whereby the edging-rolls can be rotated at a higher speed than its driving mechanism, a three-high mill, the roughing-train and three-high mill being arranged in tandem with the blooming-train, a two-high finishing-mill having its rolls arranged with their axes in or approximately in line with the axes of the rolls of the three-high mill, and a transfer mechanism in front of the three-high mill for shifting the article from a position in line with the three-high mill to a feed position in front of the two-high mill, substantially as set forth.

3. In an apparatus for rolling plates or bars, the combination of a three-high mill, feeding and receiving tables arranged one above the other in front of said mill, a feed-table having a section formed of loosely-mounted rolls in the rear of said mill, means for raising said section, a series of positively-driven rolls arranged in the plane of bite of the middle and upper rolls of the three-high mill, a two-high finishing-mill arranged with their axes in or approximately in line with the axes of the three-high mill and means for laterally transferring the article from the receiving-table in front of the three-high mill to a feeding position in front of the two-high mill, substantially as set forth.

In testimony whereof I have hereunto set my hand.

SIGMUND V. HUBER.

Witnesses:
DARWIN S. WOLCOTT,
F. E. GAITHER.